(12) United States Patent
Nakamura

(10) Patent No.: US 6,870,701 B2
(45) Date of Patent: Mar. 22, 2005

(54) MOTOR DRIVING DEVICE AND DISK DEVICE

(75) Inventor: Akira Nakamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 415 days.

(21) Appl. No.: 09/903,868

(22) Filed: Jul. 13, 2001

(65) Prior Publication Data

US 2002/0015254 A1 Feb. 7, 2002

(30) Foreign Application Priority Data

Jul. 14, 2000 (JP) ........................................ 2000-213846

(51) Int. Cl.⁷ .................... G11B 5/596; G11B 21/02
(52) U.S. Cl. .................. 360/78.13; 360/75; 318/560
(58) Field of Search .............. 360/78.01, 78.04, 360/78.06, 78.12, 78.13, 75; 318/685, 695, 671, 686, 687, 560

(56) References Cited

U.S. PATENT DOCUMENTS

| 4,383,209 A | * | 5/1983 | Lewis ......................... 318/696 |
| 5,739,661 A | * | 4/1998 | Wakuda ....................... 318/685 |
| 6,147,832 A | * | 11/2000 | Kano ....................... 360/78.13 |
| 6,188,540 B1 | * | 2/2001 | Gan et al. ................ 360/78.04 |
| 6,469,858 B1 | * | 10/2002 | Tsuyuguchi .............. 360/73.03 |

FOREIGN PATENT DOCUMENTS

| JP | 63-17598 | 2/1983 |
| JP | 5-56690 | 3/1993 |
| JP | 11-306501 | 11/1999 |
| JP | 2000-3558 | 1/2000 |
| JP | 2000-29544 | 1/2000 |

* cited by examiner

Primary Examiner—Andrew L. Sniezek
(74) Attorney, Agent, or Firm—Arent Fox, PLLC.

(57) ABSTRACT

A motor driving device is provided with a motor and a motor driver circuit for controlling the motor. The motor driver circuit limits the current supplied to the motor to a current below a predetermined limit value.

11 Claims, 3 Drawing Sheets

MOTOR DRIVING DEVICE AND DISK DEVICE

BACKGROUND OF THE INVENTION

1. Field of the Invention

The present invention relates to a motor driving device, and particularly to a disk device such as a floppy disk drive device or a CD player device.

2. Description of the Prior Art

First, as an example of a conventional motor driving device, a floppy disk drive device will be described. FIG. 4 is a block diagram showing an outline of the configuration of a conventional floppy disk drive device.

As shown in this figure, the floppy disk drive device 10 (hereinafter referred to as the "FDD device 10") has a head 30 for writing and reading signals to from a floppy disk 40 (hereinafter referred to as the "FD 40") used as a magnetic recording medium.

When a signal is written to or read from the FD 40, the head 30 is moved stepwise in the direction of a radius of the FD 40 by a stepping motor 20 so as to be positioned at the target track at which the signal is to be written or read. On the other hand, the FD 40 is rotated at a constant linear speed by a spindle motor (not shown). In place of the stepping motor 20, a motor of any type may be used, such as a voice coil motor or a linear motor.

The operation of the stepping motor 20 is controlled by a stepping motor driver circuit 50 (hereinafter referred to as the "stepper circuit 50"). The stepper circuit 50 receives, from other blocks 60 including a control circuit and other circuits, step pulses that specify the number of steps (the amount of movement) over which the head 30 is to be moved stepwise, a step direction signal that specifies the direction in which the head 30 is to be moved stepwise, and other signals. On the basis of these signals, the stepper circuit 50 controls the stepping motor 20.

Moreover, the FDD device 10 shown in the figure is equipped with a USB (universal serial bus) as an interface bus, and the FDD device 10 is connected to a host computer (not shown) such as a personal computer via the USB. A USB is a standardized interface bus that has recently been receiving much attention as an interface bus for connecting a host computer with peripheral devices (a floppy disk drive device, a printer, and the like). A USB makes it possible to use a common interface among devices that have conventionally been demanding separate interfaces.

For easy connection and convenience, the USB includes power supply lines as well as signal lines. This permits a peripheral device equipped with a USB to be designed not to rely on separate power supply lines for the supply of electric power from outside (external power). In the present specification, a device that is designed to receive electric power from its host via a USB is called a "bus-powered" device; by contrast, a device that is designed to receive electric power not via a USB but via separate power supply lines from outside is called a "self-powered" device.

The FDD device 10 shown in the figure is a bus-powered device, and therefore it depends on the USB not only for the transfer of interface signals (hereinafter referred to as the "I/F signals") between itself and the host computer but also for the supply of electric power from the host computer.

The I/F signals are exchanged directly between the host computer and the other blocks 60 provided in the FDD device 10. On the other hand, the electric power supplied from the host computer is fed not directly to the internal circuits of the FDD device 10, such as the stepper circuit 50 and the other blocks 60, but through a high-side switch circuit 70 to those circuits.

The high-side switch circuit 70 is a current limiter that limits the supply of current from the host computer to a predetermined level. Limiting the supply of current with the high-side switch circuit 70 serves to slow down the rising of the current when the FDD device 10 is plugged into the host computer, and thus helps suppress noise that accompanies the rush current.

In addition, at the output-side end of the high-side switch circuit 70, a bypass capacitor C1 is connected in parallel with the stepper circuit 50 and the other blocks 60. This permits noise components (alternating-current components) included in the output of the high-side switch circuit 70 to be diverted to ground. Thus, even if noise is superimposed on the electric power supplied to the FDD device 10, it rarely has an adverse effect on the internal circuits, such as the stepper circuit 50 and the other blocks 60.

As described above, the FDD device 10, designed as a bus-powered device, is very handy because it does not require separate power supply lines for the supply of electric power from outside. However, considering the burden on the host computer in terms of its power supply capacity, it is necessary to limit the electric power supplied to the FDD device 10. In fact, the standard regulating the USB sets a strict limit on the electric power that can be supplied via a USB, namely 5V, 500 mA at the maximum. Accordingly, the FDD device 10, designed as a bus-powered device, needs to be designed to consume as less electric power as possible, and therefore, as the stepping motor 20, a high-efficiency motor is used, which is expensive but requires a low driving current.

For example, driving a low-efficiency stepping motor such as is used in a self-powered FDD device (e.g. an FDD device built in a desk-top computer) requires a current as high as 200 to 300 mA. By contrast, driving the high-efficiency stepping motor 20 used in the bus-powered FDD device 10 requires a current as low as 80 to 90 mA.

The high-efficiency stepping motor 20, however, is supposed to be used in a comparatively narrow range of current. That is, a fluctuation in the current $I_{SB}$ that flows through the stepping motor 20 may cause improper operation thereof. The current $I_{SB}$ fluctuates with the supply voltage applied to the stepper circuit 50, and therefore, to increase the accuracy of the current $I_{SB}$, it is necessary to reduce the fluctuation of the supply voltage. To achieve this, the conventional bus-powered FDD device 10 has a regulator circuit 80 provided as a stage preceding the stepper circuit 50.

FIG. 5 is a graph showing the relationship between the supply voltage $V_{CC}$ supplied to the FDD device 10 and the current $I_{SB}$ that flows through the stepping motor 20. In this graph, the supply voltage $V_{CC}$ is taken along the horizontal axis, and the current $I_{SB}$ is taken along the vertical axis. In the graph, the solid line L5 indicates the behavior of the current $I_{SB}$; for comparison, the broken line L6 indicates the behavior of the current $I_{SS}$ that flows through a low-efficiency stepping motor in a self-powered FDD device.

As the solid line L5 indicates, thanks to the operation of the regulator circuit 80, the current $I_{SB}$ that flows through the stepping motor 20 has a range in which it remains constant irrespective of the supply voltage $V_{CC}$. Thus, by using this range as the acceptable range of the supply voltage $V_{CC}$, it is possible to drive the stepping motor 20 stably. Here, the current $I_{SB}$ is determined by the configurations of the regulator circuit 80 and of the stepper circuit 50, and is given by $$I_{SB} = (V_{rag} - V_{sat})/R_{mon} \tag{1}$$

In formula (1) above, $V_{sat}$ represents the stepper terminal saturation voltage generated within the stepper circuit 50, and $R_{mon}$ represents the serial resistor of the stepping motor 20.

In the FDD device 10 configured as described above, it is possible to apply a predetermined voltage $V_{reg}$ to the stepper circuit 50, and therefore it is possible to keep the current $I_{SB}$ that flows through the stepping motor 20 highly accurate. This helps stabilize the operation of the stepping motor 20. Moreover, at the output-side end of the regulator circuit 80, a bypass capacitor C2 is provided in parallel with the stepper circuit 50. This permits noise components (alternating-current components) included in the output of the regulator circuit 80 to be diverted to ground.

However, the FDD device 10 configured as described above requires that the regulator circuit 80 be externally fitted separately as a stage preceding the stepper circuit 50. This leads to a higher cost, and also to a larger area on the circuit board used. Moreover, for the stepper circuit 50 to be used as a common component irrespective of whether the stepping motor 20 actually used is of a high-efficiency or low-efficiency type, the regulator circuit 80 needs to be mounted and dismounted according to the specifications of the stepping motor 20. This makes the manufacturing process very ineffective.

SUMMARY OF THE INVENTION

An object of the present invention is to provide a motor driving device that, despite having a simple configuration without a regulator circuit, can control the current flowing through a motor with higher accuracy.

To achieve the above object, according to the present invention, a motor driving device is provided with a motor and a motor driver circuit for controlling the motor, and the motor driver circuit has a function of limiting the current supplied to the motor below a predetermined limit value.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1A:
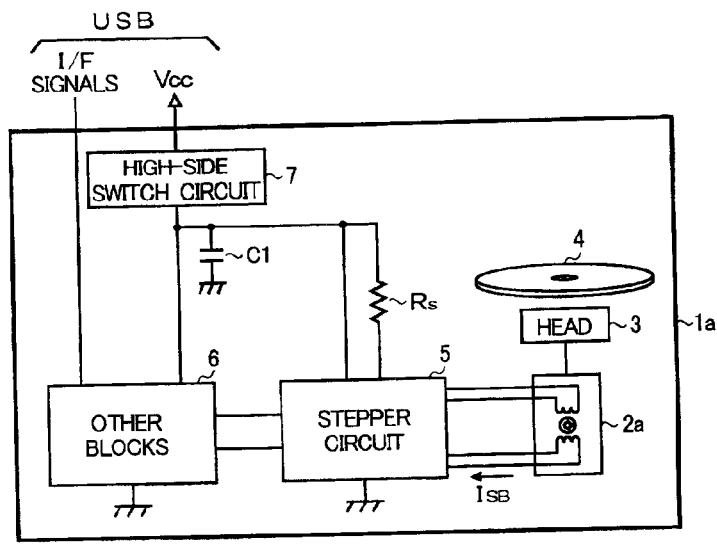
FIG. 1A is a block diagram of a floppy disk drive device (of a bus-powered type) of a first embodiment of the invention.
Figure 1B:
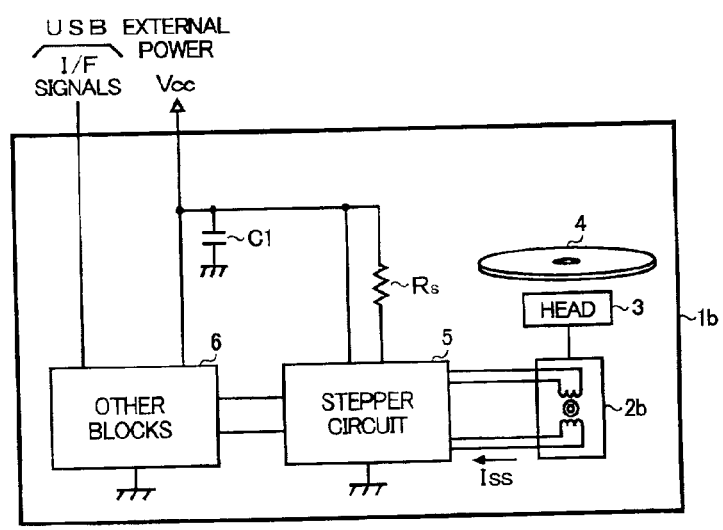
FIG. 1B is a block diagram of a floppy disk drive device (of a self-powered type) of a second embodiment of the invention.

Now, as examples of motor driving devices embodying the invention, floppy disk drive devices will be described. FIG. 1A is a block diagram of the floppy disk drive device of a first embodiment of the invention. FIG. 1B is a block diagram of the floppy disk drive device of a second embodiment of the invention. The floppy disk drive devices 1a and 1b (hereinafter referred to as the FDD devices 1a and 1b) shown in FIGS. 1A and 1B are both equipped with a USB (universal serial bus) as an interface bus, and is connected to a host computer such as a personal computer via the USB.

The FDD device 1a shown in FIG. 1A is designed as a bus-powered device, and therefore it depends on the USB not only for the transfer of interface signals (hereinafter referred to as the "I/F signals") between itself and the host computer but also for the supply of electric power from the host computer. On the other hand, the FDD device 1b shown in FIG. 1B is designed as a self-powered device, and therefore it receives electric power not via a USB but via separate power supply lines from outside (external power).

First, the FDD device 1a of a bus-powered type shown in FIG. 1A will be described. As shown in the figure, the FDD device 1a has a head 3 for writing and reading signals to and from a floppy disk 4 (hereinafter referred to as the "FD 4") used as a magnetic recording medium. When a signal is written to or read from the FD 4, the head 3 is moved stepwise in the direction of a radius of the FD 4 by a stepping motor 2a so as to be positioned at the target track at which the signal is to be written or read. The stepping motor 2a here is a high-efficiency stepping motor that complies with the strict limit on the electric power that can be supplied via a USB, and thus operates with a current as low as 80 to 90 mA. On the other hand, the FD 4 is rotated at a constant linear speed by a spindle motor (not shown).

The operation of the stepping motor 2a is controlled by a stepping motor driver circuit 5 (hereinafter referred to as the "stepper circuit 5"). The stepper circuit 5 receives, from other blocks 6 including a control circuit and other circuits, step pulses that specify the number of steps (the amount of movement) over which the head 3 is to be moved stepwise, a step direction signal that specifies the direction in which the head 3 is to be moved stepwise, and other signals. On the basis of these signals, the stepper circuit 5 controls the stepping motor 2a.

The I/F signals exchanged between the host computer and the FDD device 1a are fed directly to the other blocks 6 of the FDD device 1a via the USB. On the other hand, the electric power supplied from the host computer is fed not directly to the internal circuits of the FDD device 1a, such as the stepper circuit 5 and the other blocks 6, but through a high-side switch circuit 7 to those circuits.

The high-side switch circuit 7 is a current limiter that limits the supply of current from the host computer to a predetermined level. Limiting the supply of current with the high-side switch circuit 7 serves to slow down the rising of the current when the FDD device 1a is plugged into the host computer, and thus helps suppress noise that accompanies the rush current.

In addition, at the output-side end of the high-side switch circuit 7, a bypass capacitor C1 is connected in parallel with the stepper circuit 5 and the other blocks 6. This permits noise components (alternating-current components) included in the output of the high-side switch circuit 7 to be diverted to ground. Thus, even if noise is superimposed on the electric power supplied to the FDD device 1a, it rarely has an adverse effect on the internal circuits, such as the stepper circuit 5 and the other blocks 6.

In the FDD device 1a of this embodiment, a resistor Rs for current detection is provided between the high-side switch circuit 7 and the stepper circuit 5. The stepper circuit 5 compares the voltage across the resistor Rs with a predetermined reference voltage, and performs feedback control in such a way as to keep the voltage across the resistor Rs below the reference voltage, i.e. in such a way as to limit the current that flows through the resistor Rs. Through this feedback control, it is possible to limit the current $I_{SB}$ that flows through the stepping motor 2a below a predetermined limit value.

In this feedback control, if the reference voltage with which the voltage across the resistor Rs is compared is constant, the limit value for the current $I_{SB}$ is determined by the resistance of the resistor Rs. Accordingly, by adjusting the resistance of the resistor Rs in such a way that the limit value equals the driving current (80 to 90 mA) of the stepping motor 2a so that, with the stepper circuit 5 constantly performing current limiting operation, the stepping motor 2a is driven with a constant current, it is possible to keep the current $I_{SB}$ equal to the driving current of the stepping motor 2a without additionally providing a regulator circuit.

Next, the FDD device 1b of a self-powered type shown in FIG. 1B will be described. Here, such circuit blocks and elements as have the same configurations and functions as in the FDD device 1a of a bus-powered type described above are identified with the same reference numerals and symbols, and their explanations will not be repeated. Thus, in the following descriptions, only the differences from the FDD device 1a will be selectively explained.

As shown in FIG. 1B, the FDD device 1b of a self-powered type has almost the same configuration as the FDD device 1a of a bus-powered type described above. The chief difference is that, since the FDD device 1b of a self-powered type need not comply with the strict limit on the electric power that can be supplied via a USB, it uses an inexpensive, low-efficiency stepping motor (operating with a driving current of 200 to 250 mA) as the stepping motor 2b. Nor is it necessary here to provide a high-side switch circuit 7 as in the FDD device 1a. Accordingly, the power supplied from the host computer is fed directly to the internal circuits, such as the stepper circuit 5 and the other blocks 6.

On the other hand, as in the FDD device 1a, a resistor Rs for current detection is provided in the line by way of which electric power is supplied from outside to the stepper circuit 5. The stepper circuit 5 compares the voltage across the resistor Rs with a predetermined reference voltage, and performs feedback control in such a way as to keep the voltage across the resistor Rs below the reference voltage, i.e. in such a way as to limit the current that flows through the resistor Rs. Through this feedback control, it is possible to limit the current $I_{SS}$ that flows through the stepping motor 2b below a predetermined limit value.

In the FDD device 1b of this embodiment, however, the resistance of the resistor Rs is adjusted in such a way that the limit value for the current $I_{SS}$ is higher (for example, 400 mA) than the driving current (200 to 250 mA) of the stepping motor 2b. In this configuration, the stepping motor 2b is supplied with electric power without the stepper circuit 5 performing current limiting operation, and therefore it is possible to drive the stepping motor 2b in a saturated state.

Figure 2:
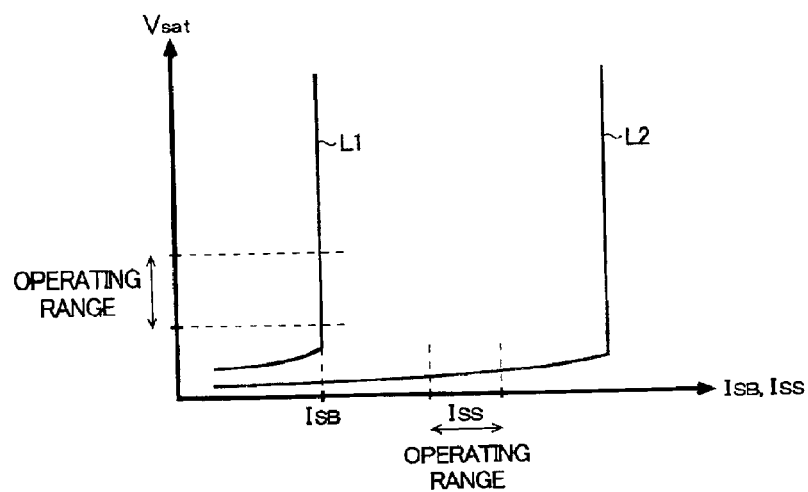
FIG. 2 is a graph showing the relationship between the currents $I_{SB}$ and $I_{SS}$ flowing through the stepping motors 2a and 2b, respectively, and the stepper terminal saturation voltage $V_{sat}$ generated within the stepper circuit 5.

Now, with reference to FIGS. 2 and 3, how the currents $I_{SB}$ and $I_{SS}$ are controlled in the FDD devices 1a and 1b described above will be described in more detail. FIG. 2 is a graph showing the relationship between the currents $I_{SB}$ and $I_{SS}$ flowing through the stepping motors 2a and 2b, respectively, and the stepper terminal saturation voltage $V_{sat}$ generated within the stepper circuit 5. In this graph, the currents $I_{SB}$ and $I_{SS}$ are taken along the horizontal axis, and the stepper terminal saturation voltage $V_{sat}$ is taken along the vertical axis. In the graph, the solid line L1 indicates the behavior of the current $I_{SB}$, and the solid line L2 indicates the behavior of the current $I_{SS}$.

Figure 3:
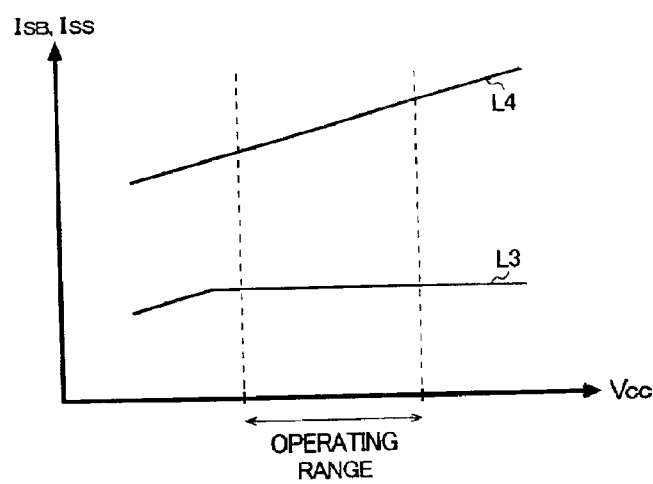
FIG. 3 is a graph showing the relationship between the supply voltage $V_{CC}$ supplied to the FDD device 1a and 1b and the currents $I_{SB}$ and $I_{SS}$ flowing through the stepping motors 2a and 2b, respectively.
Figure 4:
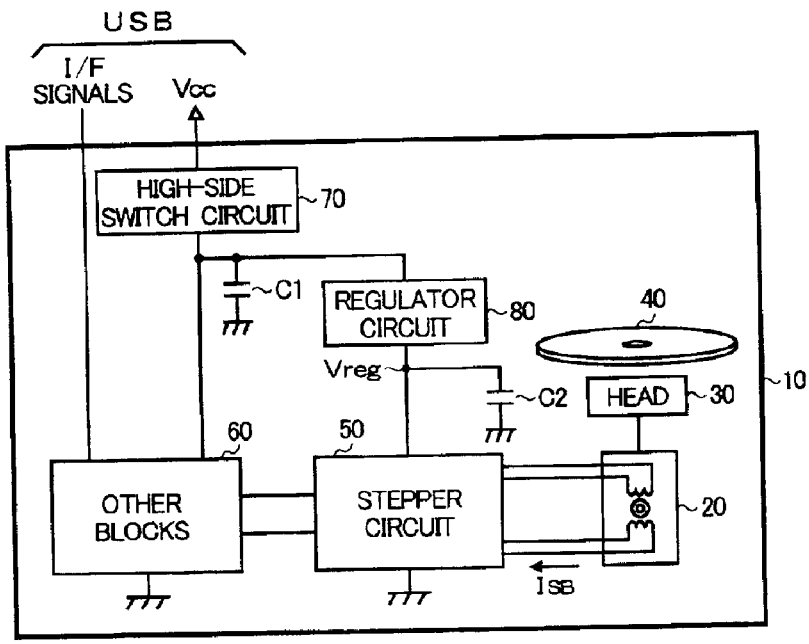
FIG. 4 is a block diagram showing an outline of the configuration of a conventional floppy disk drive device.
Figure 5:
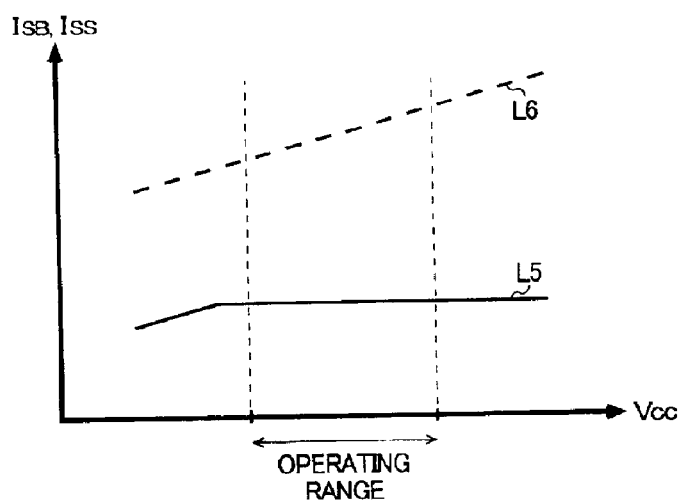
FIG. 5 is a graph showing the relationship between the supply voltage $V_{CC}$ supplied to the FDD device 10 and the current $I_{SB}$ flowing through the stepping motor 20.

FIG. 3 is a graph showing the relationship between the supply voltage $V_{CC}$ supplied to the FDD device 1a and 1b and the currents $I_{SB}$ and $I_{SS}$ flowing through the stepping motors 2a and 2b, respectively. In this graph, the supply voltage $V_{CC}$ is taken along the horizontal axis, and the currents $I_{SB}$ and $I_{SS}$ are taken along the vertical axis. In the graph, the solid line L3 indicates the behavior of the current $I_{SB}$, and the solid line L4 indicates the behavior of the current $I_{SS}$.

As described earlier, in the FDD device 1a of a bus-powered type, the resistance of the resistor Rs is adjusted in such a way that the stepping motor 2a is supplied with electric power with the stepper circuit 5 constantly performing current limiting operation. As a result, as the solid line L3 indicates in FIG. 3, the current $I_{SB}$ is kept at a predetermined limit value, i.e. equal to the driving current (80 to 90 mA) of the stepping motor 2a. In this way, in the FDD device 1a of the first embodiment, it is possible to keep the current $I_{SB}$ equal to the driving current of the stepping motor 2a without additionally providing a regulator circuit, and thus it is possible to stabilize the operation of the stepping motor 2a with a simple configuration.

However, with current limiting operation being performed on the current $I_{SB}$, as the solid line L1 indicates in FIG. 2, the stepper terminal saturation voltage $V_{sat}$ is generated within the stepper circuit 5. Therefore, in implementing the FDD device 1a, it is advisable to determine the limit value for the current $I_{SB}$ in such a way as to minimize the stepper terminal saturation voltage $V_{sat}$, and adjust the resistance of the resistor Rs in such a way as to obtain that limit value. Here, to minimize the voltage drop in the output, it is advisable to set the resistance of the resistor Rs to be 1 Ω or lower.

On the other hand, in the FDD device 1b of a self-powered type, the resistance of the resistor Rs is adjusted in such a way that the stepping motor 2b is supplied with electric power without the stepper circuit 5 performing current limiting operation. As a result, as the solid line L4 indicates in FIG. 3, the current $I_{SS}$ varies according to the supply voltage $V_{CC}$ supplied from outside. Here, the current $I_{SS}$ is given by $$I_{SS}=(V_{CC}-V_{sat})/(R_{mon}+R_s) \qquad (2)$$

In the FDD device 1b, as in the FDD device 1a, it is possible to adjust the resistance of the resistor Rs in such a way that the limit value for the current $I_{SS}$ is equal to the driving current (200 to 250 mA) of the stepping motor 2b so that the stepping motor 2b is driven with the stepper circuit 5 constantly performing current liming operation. However, in this configuration, as the saturation voltage $V_{sat}$, which is ascribable to the stepper circuit 5 and the resistor Rs, increases, the power consumption within the stepper circuit 5 becomes unduly high, producing too much heat within the stepper circuit 5. Thus, this configuration is not very practical.

By contrast, with a configuration, like that of the FDD device 1b of the second embodiment, in which the stepper circuit 5 does not perform current limiting operation, as the solid line L2 indicates in FIG. 2, it is possible to minimize the saturation voltage $V_{sat}$ that is consumed within the stepper circuit 5, and thereby suppress the heat generated within the stepper circuit 5 to a negligible level. Moreover, the FDD device 1b permits the low-efficiency stepping motor 2b provided therein to maintain satisfactorily stable operation even if the current $I_{SS}$ fluctuates slightly.

As described above, in the FDD devices 1a and 1b according to the present invention, simply by adjusting the resistance of the resistor Rs according to whether the stepping motors 2a and 2b are of a high-efficiency or low-efficiency type, it is possible to use a common stepper circuit 5 irrespective of the specifications of the stepping motors 2a and 2b.

Moreover, the adjustment of the resistance of the resistor Rs provided outside the stepper circuit 5 is very simple as compared with the mounting and dismounting of a regulator circuit as practiced conventionally. This helps make the manufacturing process of FDD devices far simpler and more efficient. Furthermore, the resistor Rs is very inexpensive as compared with a regulator circuit. This contributes to cost reduction of FDD devices.

The embodiments described above deal with cases in which the present invention is applied to floppy disk drive devices. However, the present invention is applicable to a variety of devices other than floppy disk drive devices, for example to magnetic and optical disk devices similar thereto, and to motor driving devices of other types. The present invention is applicable even to devices other than motor driving device that yield high-current outputs.

What is claimed is:

1. A motor driving device comprising:

a motor;

a motor driver circuit for controlling motion of the motor; and an externally fitted resistor provided in a line by way of which electric power is supplied to the motor, wherein the motor driver circuit limits a current supplied to the motor below a predetermined limit value by comparing a voltage across the resistor with a single reference voltage and performing feedback control in such a way that the voltage across the resistor is kept below the predetermined voltage.

2. A motor driving device as claimed in claim 1, wherein the limit value can be adjusted by varying the resistance of the resistor.

3. A motor driving device as claimed in claim 1, wherein the limit value is brought down to a predetermined value that is required to drive the motor so that the motor is driven with a constant current.

4. A motor driving device as claimed in claim 1, wherein the limit value is brought up above a predetermined value that is required to drive the motor so that the motor is driven in a saturated state.

5. A motor driving device as claimed in claim 1, wherein the motor driving device has a USB (universal serial bus) as an interface bus and is designed as a bus-powered device that is supplied with electric power via the USB.

6. A motor driving device as claimed in claim 1, wherein the motor driving device is a disk device and the motor is a stepping motor.

7. A disk device comprising:

a head for writing and reading data to and from a disk;

a stepping motor for moving the head stepwise in a direction of a radius of the disk;

a stepping motor driver circuit for controlling the stepping motor; and an externally fitted resistor provided in a line by way of which electric power is supplied to the stepping motor, wherein the stepping motor driver circuit limits a current supplied to the stepping motor below a predetermined limit value by comparing a voltage across the resistor with a single reference voltage and performing feedback control in such a way that the voltage across the resistor is kept below the predetermined voltage.

8. A disk device as claimed in claim 7, wherein the limit value can be adjusted by varying the resistance of the resistor.

9. A disk device as claimed in claim 7, wherein the limit value is brought down to a predetermined value that is required to drive the stepping motor so that the stepping motor is driven with a constant current.

10. A disk device as claimed in claim 7, wherein the limit value is brought up above a predetermined value that is required to drive the stepping motor so that the stepping motor is driven in a saturated state.

11. A disk device as claimed in claim 7, wherein the disk device has a USB (universal serial bus) as an interface bus and is designed as a bus-powered device that is supplied with electric power via the USB.

* * * * *